(12) United States Patent
Prantl et al.

(10) Patent No.: US 10,007,101 B2
(45) Date of Patent: Jun. 26, 2018

(54) ILLUMINATION DEVICE FOR A MICROSCOPE OR AN OPTICAL 3D SURFACE MEASURING APPARATUS

(71) Applicant: Alicona Imaging GmbH, Raaba bei Graz (AT)

(72) Inventors: Manfred Prantl, Graz (AT); Stefan Scherer, Graz (AT); Franz Helmli, St. Nikolai/Sausal (AT); Attila Saghy, Mosonmagyrovar (HU)

(73) Assignee: ALICONA IMAGING GMBH, Raaba Bei Graz (AT)

( * ) Notice: Subject to any disclaimer, the term of this patent is extended or adjusted under 35 U.S.C. 154(b) by 0 days. days.

(21) Appl. No.: 15/308,728

(22) PCT Filed: Apr. 24, 2015

(86) PCT No.: PCT/EP2015/058887
§ 371 (c)(1),
(2) Date: Nov. 3, 2016

(87) PCT Pub. No.: WO2015/169620
PCT Pub. Date: Nov. 12, 2015

(65) Prior Publication Data
US 2017/0184831 A1  Jun. 29, 2017

(30) Foreign Application Priority Data
May 5, 2014 (AT) .............................. A 50319/2014

(51) Int. Cl.
  *G02B 21/08* (2006.01)
  *G02B 3/08* (2006.01)
  *G02B 3/00* (2006.01)
(52) U.S. Cl.
  CPC ......... *G02B 21/084* (2013.01); *G02B 3/0056* (2013.01); *G02B 3/08* (2013.01)

(58) Field of Classification Search
  CPC .. G02B 21/0032; G02B 21/06; G02B 21/084; G02B 3/0056; G02B 3/08
  (Continued)

(56) References Cited

U.S. PATENT DOCUMENTS

| 2,831,394 A | * | 4/1958 | Heenan | .................... G02B 3/08 340/815.76 |
| 5,404,869 A | | 4/1995 | William et al. | |

(Continued)

FOREIGN PATENT DOCUMENTS

| AT | A50319/2014 | 11/2015 |
| EP | 1933187 A1 | 6/2008 |

(Continued)

OTHER PUBLICATIONS

IPRP and Written Opinion of PCT/EP2015/058887, dated Nov. 17, 2016, filed Apr. 24, 2015.

(Continued)

*Primary Examiner* — Frank Font
(74) *Attorney, Agent, or Firm* — Workman Nydegger (57) ABSTRACT

An illumination device for a microscope or an optical 3D surface measuring apparatus, more particularly according to the principle of focus variation. The illumination device includes LEDs arranged in a planar fashion, and an illumination optical unit for imaging the illumination spectrum onto an object to be examined. The illumination optical unit includes an arrangement of converging lenses and one Fresnel lens, and the light beams emitted by the LEDs firstly impinge on the converging lenses and then impinge in a parallel-directed manner on the Fresnel lens. The Fresnel lens is oriented in reflective arrangement such that lens vertices of a prism structure are arranged at a light exit side of the Fresnel lens, facing away from the converging lenses. The converging lenses are formed by annular segments, and (Continued)

adjacent annular segments adjoin one another in a planar fashion at a segment side surface.

14 Claims, 5 Drawing Sheets

(58) Field of Classification Search
USPC ............ 359/385, 387, 390; 362/225, 217.02, 362/217.14–217.16, 237, 240, 243, 247, 362/249.01, 249.06, 249.14, 317–361; 356/489, 495, 511
See application file for complete search history.

(56) References Cited

U.S. PATENT DOCUMENTS

| | | | | |
|---|---|---|---|---|
| 6,454,437 | B1* | 9/2002 | Kelly | G01J 3/10 359/287 |
| 6,488,398 | B1* | 12/2002 | Bloch | G02B 21/06 359/368 |
| 7,357,529 | B2* | 4/2008 | Choate | G01N 21/8806 359/387 |
| 7,782,513 | B1* | 8/2010 | Gladnick | G01N 21/8806 356/237.2 |
| 2003/0156409 | A1* | 8/2003 | Choate | G01N 21/8806 362/235 |
| 2009/0109285 | A1* | 4/2009 | Tobiason | G02B 21/06 348/79 |
| 2012/0075870 | A1* | 3/2012 | Kayanuma | F21V 5/04 362/311.06 |
| 2015/0286043 | A1* | 10/2015 | Doe | G02B 21/084 348/79 |

FOREIGN PATENT DOCUMENTS

| | | |
|---|---|---|
| JP | 3148355 B2 | 3/2001 |
| JP | 2003315678 A | 11/2003 |
| JP | 2009258246 A | 11/2009 |
| WO | WO2012053241 | 4/2012 |
| WO | PCT/EP15/58887 | 11/2015 |

OTHER PUBLICATIONS

International Search Report of PCT/EP2015/058887, dated Aug. 21, 2015, filed Apr. 24, 2015.
Written Opinion of PCT/EP2015/058887, dated Aug. 21, 2015, filed Apr. 24, 2015.

* cited by examiner

ILLUMINATION DEVICE FOR A MICROSCOPE OR AN OPTICAL 3D SURFACE MEASURING APPARATUS

TECHNICAL FIELD

The invention relates to an illumination device for a microscope or an optical 3D surface measuring apparatus, more particularly for a 3D surface measuring apparatus according to the principle of focus variation, having the features of the preamble of claim 1. Such an illumination device has been known from the document JP 3148355 B2.

BACKGROUND

A three-dimensional (further briefly designated as "3D") measuring principle of focus variation for the recognition of a microscopic 3D structure of surfaces is a principle of 3D recognition using the low depth of focus of microscope optics, which has been well-known for several years. The measuring method is also described in the current ISO standard 25178-6 as a potential measuring method for the determination of high-resolution 3D geometry information in the micro- and nanometer range. With this measuring method, an image staple of an object is evaluated by means of algorithms of digital image processing, so that for each image pixel there is determined that image from the image staple, in which the respective image pixel has maximum depth of focus. The image staple is typically generated by a relative movement between object and objective of the image recording system, wherein this relative movement is typically performed along the optical axis of the objective. As this relative movement is exactly recorded via a suitable measuring system (e.g., a linear scale), a 3D model of the object may be generated by determining the most focused image pixels.

As the measuring principle of focus variation is based on the evaluation of the local image contrast, optimum sample illumination thereby is of utmost importance. In this view, classically there are two different illumination arrangements:
1. A so-called co-axial illumination, in which the light is applied onto the measuring object through the measuring objective.
2. A ring light illumination arrangement, in which the illumination elements are arranged in an annular form around the measuring objective and in which the light beams impinge laterally on the measuring object.

Both types of illumination may be used separately or also in combination. This invention relates to a type of ring light illumination that is especially suitable for the measuring principle of focus variation.

The requirements for an illumination device having a ring light for a 3D surface measuring apparatus according to the principle of focus variation are as follows:
1. As much light as possible should be directed onto that area of the measuring sample, which lies within the visual range of the measuring objective.
2. The illumination device is to have a possibly large illumination aperture, i.e. the light is to impinge on the sample across a possibly large angle range in order to ensure good illumination of relatively flat as well as steep areas of the sample.
3. The light should be as evenly distributed as possible across the illuminated angle range as well as also locally across the illuminated surface area in order to prevent disturbing highlights or artificial contrast differences. This requirement results from the fact that otherwise highlights could lead to measurement errors on weakly texturized measuring objects.
4. The illumination device or the ring light, respectively, should be efficient, i.e. as much of the electric power introduced as possible should be converted into light and directed onto the sample so that the ring light will not unnecessarily heat the measuring apparatus, thus leading to measurement inaccuracies.
5. The illumination device or the ring light, respectively, should be constructed as compact as possible in order to have a small interference contour in order to not collide with the sample during a scanning process, in which the surface topography of the sample to be examined is recognized. Furthermore, the operating distance from the measuring objective to the measuring sample should not be reduced by the illumination device or by the ring light, respectively, in order to enable recognition of an as high number of measuring samples as possible.
6. As typical surface measuring apparatuses according to the principle of focus variation have an objective revolver for the easy change of magnification, from a practical point of view it is further advantageous if the ring light may be changed quickly from one objective to the next one, thereby taking into account the different operational distances of the objectives.

The present invention addresses all these requirements and describes an illumination device that is especially well suitable for the measuring principle of focus variation.

Light sources for microscopes and surface measuring apparatuses used so far, e.g. halogen lamps, have numerous disadvantages in regard to the increasing miniaturization of components in the field of microscopy. They are expensive, require high electric power and have comparatively large dimensions, have a high heat dissipation, a short service life, and their colour spectrum is changing with the change of brightness.

From prior art there have already been known different embodiments of illumination devices, in which the light-emitting diodes (LED's) are usually arranged in an annular fashion around a measuring objective and which serve as reflected light for the illumination of microscopic specimens. From the document JP 2003-315678A there is, for example, known a ring light, which includes several light-emitting diodes for illumination, which are arranged concentrically about an optical axis of the microscope objective. The light-emitting diodes are therefore arranged, viewed in the direction of the beam passage, in a defined distance of a lens arrangement having converging lenses. The light emitted by the light-emitting diodes thereby impinges in the direction of the beam passage on a planar entry surface at a rear side of the planar-convex converging lenses, which are each convex-curved at the front side thereof or at an exit side of the light beams, respectively. The circular converging lenses thus are arranged in an annular fashion, serving to generate an as parallel as possible beam course of the light emitted by the light-emitting diodes. Further in the beam direction, the light impinges directly from the circularly arranged converging lenses on a Fresnel lens, in which the light beams entering are refracted, thereby being deflected and focused onto a focal point having a defined focal length, this is a defined distance spaced apart in the beam direction from the exit plane of the Fresnel lens. The Fresnel lens is thereby arranged according to the document JP 2003-315678A as a transmitting Fresnel lens in a way such that the staggered form thereof in the beam direction is oriented at the internal side towards the converging lenses or such that the steps of the Fresnel lens are located at the entry side of the light beams, respectively, which is why in this arrangement the transmitting Fresnel lens is used as a refraction lens. The specimen to be illuminated is disposed near or within the focal point of the Fresnel lens.

This embodiment is disadvantageous at least in so far as there will occur large losses of light during light refraction in the transmitting Fresnel lens, in particular if the refraction angle is very large. For this reason, due to refraction losses, especially light from the fringe areas of the Fresnel lens or of the ring light, will be lost, which is why the illumination intensity of the ring light in total will be reduced. The ring light, hence, meets the efficiency requirements as described above only insufficiently. Similarly, the homogeneity requirement across the illuminated angle range is met only very poorly, as the losses in the fringe area of the ring light differ greatly from the losses at the innermost ring of the ring light. Further, in the arrangement known from JP 2003-315678A there is given the disadvantage that, due to the determined distance between the light-emitting diodes and the converging lenses, stray light, which is not captured and focused by the converging lenses, will be lost. As the light-emitting diodes and, to the same extent, also the converging lenses are spaced apart from each other, there is not provided any spatially homogenous illumination of the sample, and in the illumination of the specimen using reflected light undesired highlights may appear, which will impair the image contrast of the specimens to be examined. Highlights will act like artificial contrast pixels and may lead to incorrect measurements in the evaluation of the images according to the principle of focus variation.

From the document EP 1 933 187 A1 there has been known an illumination system for chirurgical microscopes, wherein Fresnel lenses are used for focusing collinear light beams from a plurality of light-emitting diodes.

The document JP 2009258246 A discloses a prism-like Fresnel lens systems in a reflective arrangement.

ASPECTS OF SOME EXAMPLE EMBODIMENTS

It is, hence, the task of the present invention to provide an illumination device for a microscope or a 3D surface measuring apparatus, more particularly for a 3D surface measuring apparatus according to the measuring principle of focus variation, wherein the disadvantages of prior art mentioned are being prevented.

In order being able to perform 3D surface measurements by means of focus variation of component geometries at the highest vertical resolution, it is required, as already mentioned above, that such an illumination device has an as high efficiency as possible, that is as much as possible of the energy introduced is focused as light onto a small area, essentially within the visual range at the surface of the respective specimen. Further, using such an illumination device, the illuminated area of the specimen is to be illumined as homogenous as possible. Homogenous illumination is intended to mean that a light distribution in the X-Y axis direction of the plane of an object slide or in the plane of the surface of a specimen or component to be examined, as well as the light distribution across the spatial angle of the illumination are to be as homogenous as possible. This homogeneity of light distribution is necessary in order to cause as few measuring artefacts or highlights as possible when illuminating the sample. It is further intended to achieve an as large as possible illumination aperture using such an illumination device. Thus, it is the purpose that light from an as large as possible angle range is directed onto the respective specimen to be examined, wherein the minimum and the maximum angle are to be spaced apart from each other as widely as possible and wherein the maximum angle, at which the light impinges on the sample, is to be as flat as possible. Thereby it is further to be considered that the illumination device itself is not moved too closely to the specimen on the object slide, which hereby will collide with the specimen, or at least the illumination device will generate disadvantageous interference contours on the sample. This is difficult to be achieved in particular with objectives having a short operational distance.

These tasks are solved by an illumination device having the features of claim 1. The sub-claims relate to especially advantageous embodiments of the invention.

The illumination device according to the invention for a microscope or a 3D surface measuring apparatus, more particularly for a 3D surface measuring apparatus according to the principle of focus variation, comprises light sources that are arranged in a planar fashion for generating an illumination spectrum as well as an illumination optical unit for imaging the illumination spectrum onto an object to be examined. The light sources are light-emitting diodes. The illumination optical unit comprises an arrangement of a plurality of converging lenses and at least one Fresnel lens, wherein the light beams emitted by the light-emitting diodes first impinge on the converging lenses and then impinge further on the Fresnel lens as essentially parallel-directed entry light beams. At the at least one Fresnel lens, lens vertices of a prism structure are oriented in a reflective arrangement at a light exit side of the Fresnel lens, which light exit side is facing away from the converging lenses.

Contrary to the arrangement known from the JP 2003-315678A, wherein the Fresnel lens is based on the principle of refraction and is used as transmitting Fresnel lens, herein in the case of the invention, the at least one Fresnel lens is used in a reflective arrangement based on the principle of internal total reflection. An essential advantage of this novel approach is that herein there is achieved a significantly better efficiency with illumination devices having a high numerical aperture. Numerical aperture means the capability of an optical element to focus light. With a reflectively arranged Fresnel lens, as it is the present case, significantly more light is directed from the fringe areas of the illumination device into the visual range of the microscope optics. Advantageously, a loss of light of the reflective Fresnel lens is, hence, significantly reduced, with the light yield being higher than with an arrangement having a transmitting Fresnel lens, which has been known from prior art. At the equivalent illuminance, a specimen on the object slide of a microscope or a 3D measuring apparatus, may be illuminated using less electric power and, consequently, resulting in less introduction of heat.

Using the illumination device according to the invention, it is thus possible to direct light from an as large as possible angle range onto a component sample to be examined or onto a specimen to be examined. For this reason, a minimum and a maximum exit angle of the exit light beams from the optical unit of the illumination device are to be spaced apart as widely as possible, and the maximum angle, at which the light impinges on the sample or on the specimen on the object slide of the microscope, is to be as flat as possible. In particular in the 3-dimensional surface measurement by means of focus variation, this novel illumination device offers huge advantages, as due to the high numerical aperture, which may be achieved using the illumination device according to the invention, also objects and surface details having steep edges and contours may be measured.

According to the invention, in an illumination device the converging lenses are formed by annular segments, wherein adjacent annular segments adjoin one another at least at a segment side surface. Converging lenses serve to generate a parallel beam course, that is for collimation. Within the frame of the invention, converging lenses are advantageously used in the form of annular segments, whereby there are fewer gaps between adjoining converging lenses and, for this reason, on the one side, the efficiency of the illumination will be increased, as more light will be collected by the converging lenses and directed into the visual range of the optical unit than this will be the case with discrete and spaced-apart converging lenses known from prior art. Furthermore, the homogeneity of the illumination will be increased, as fewer gaps are present in the lens arrangement, the so-called lens array, of the converging lenses, and as the uniformity of the collimated light, for this reason, is improved—in regard to local homogeneity as well as angular homogeneity. The converging lenses are made, for example, from plastic material.

Neither the JP 3148355 B2 nor the JP 2003315678 A show an illumination device, wherein the converging lenses are formed by annular segments, wherein adjoining annular segments adjoin one another in a planar fashion at least at one segment side surface. The JP 3148355 B2 merely shows several converging lenses 11 that are widely spaced apart. In the JP 2003315678 A, however, there is depicted a higher number of converging lenses arranged in concentric circles, but these converging lenses 31 are formed in a circular way and may, hence, due to geometrical reasons, adjoin one another only at points. From the figures, however, it is clear that the converging lenses are spaced apart from each other.

In particular with optical 3D surface measuring apparatuses according to the principle of focus variation, the uniform illumination of the objects to be measured plays an enormous role for measurement accuracy. In the illumination device according to the invention, contrary to prior art, there may be achieved an especially high level of illumination uniformity. The advantages of this embodiment according to the invention of an illumination device are especially clearly shown, if the object to be measured has a very reflective material (e.g. a smooth metal surface). Others than the illumination according to the invention will at these critical objects lead to a non-uniform, mostly strip-like illumination, manifesting in essentially worse measurement results.

In an advantageous variant of the invention, in an illumination device the adjoining annular segments are arranged in an annular fashion towards each other.

In an illumination device according to the invention the annular segments are usefully arranged in concentric rings, adjoining one other.

In an illumination device according to the invention, the annular segments arranged in an annular fashion are preferably arranged concentrically to an objective axis of a microscope objective.

In an illumination device the Fresnel lens is advantageously arranged in a removable manner and may be replaced, if required, for different cases of application or for the use of microscope objectives having different focal lengths or having different operational distances. In this way, Fresnel lenses having different prism structures and/or having different focal lengths, may be inserted especially easily and conveniently into the illumination device. If required, quick replacement or change of the illumination device between different Fresnel lenses is thus possible rather simply.

In an illumination device according to the invention the at least one Fresnel lens has advantageously at a light exit side one planar first surface, wherein incident entry light beams impinge in an essentially perpendicular manner on the first surface and wherein at the light exit side of the Fresnel lens there are arranged second surfaces as well as third surfaces, wherein the second surfaces and the third surfaces each form corner angles of the prism structure. In the reflective arrangement of the Fresnel lens it is advantageous that the light entry side of the Fresnel lens has a planar first surface. In this way, different Fresnel lenses having different focal lengths may be replaced especially easily.

In an illumination device according to the invention, the third surfaces of the prism structure are advantageously arranged essentially vertically to the first surface at the light entry side.

In an illumination device according to the invention the entry light beams particularly advantageously impinge within the Fresnel lens at an entry refraction angle on the second surfaces, thereby undergo a total reflexion, wherein the entry refraction angle is determined in relation to a vertical onto the second surfaces, and the refracted light beams that are reflected upon impinging on the second surfaces impinge at an exit refraction angle, which is determined in relation to a vertical onto the third surfaces, on the third surfaces, wherein the exit light beams exit the Fresnel lens at an exit angle, which is determined in relation to a vertical onto the third surfaces, at the third surfaces of the prism structure.

In an illumination device according to the invention the corner angles between the second surfaces and third surfaces of the prism structure are advantageously from 20° to 50°, preferably from 30° to 40°. In order to achieve the exit angles of the exit light beams required for an optimum illumination of a specimen, which exit angles are usually between about 40° and about 70°, in a reflective arrangement of the Fresnel lens the corner angles between the second surfaces and the third surfaces of the prism structures are advantageously larger having corner angles of the prism structure from 20° to 50°, preferably from 30° to 40°, than is the case with a transmitting arrangement of the Fresnel lens. This offers numerous advantages of the simpler production as well as the easier handling, as the lens vertices in the case of a Fresnel lens having a reflective arrangement are protected against damage in an essentially more robust way.

In an illumination device according to the invention the light-emitting diodes are usefully arranged in the focal points of the converging lenses. Advantageously, a larger portion of emitted light may thus be captured by the converging lenses, thus the illumination is also becoming more homogenous.

In an illumination device according to the invention the light sources are especially advantageously surface-mounted SMD light-emitting diodes. SMD is the abbreviation of "surface-mounted device" and in general designates miniature designs, enabling a significant reduction of circuits and devices by means of smaller component dimensions and, hence, a higher component density, a smaller circuit board distance and thinner circuit paths on circuit boards. In the case of the invention, SMD light-emitting diodes have the advantage that these SMD light-emitting diodes are arranged in the focal point of the individual converging lenses of the converging lenses array. In this way, more light may be captured and collimated by the individual SMD light-emitting diodes, this in turn achieving a higher efficiency than with solutions known from prior art.

In a development of the invention, the illumination device may be mounted to an objective of a 3D surface measuring apparatus or a microscope, or removed therefrom, respectively.

In another embodiment variant of the invention, the illumination device may be advantageously attached to an objective of a 3D surface measuring apparatus or a microscope, in a removable manner, preferably magnetically. In this way, by means of simple replacement of the Fresnel lens or by an appropriately changed arrangement having, for example, a larger distance between Fresnel lens and lens array of the converging lenses, the illumination device may be adjusted to objectives having different focal lengths in a simple way. Hence, the illumination device according to the invention is preferably suitable for the utilization at revolver objectives of microscopes or of 3D surface measuring apparatuses.

In an especially compact embodiment of the invention, the illumination device, in a position mounted onto an objective, may be conductively connected to complementary power supply connectors disposed on the objective and/or on the 3D surface measuring apparatus or the microscope, by means of power supply contacts. In this way, an external cable for power supply and/or signal transmission to the illumination device, which is usually typically required, may thus be omitted. Cables for power supply and/or signal transmission will form an interference contour in regard to the measuring sample as well as in a rotating objective revolver, where otherwise the cables may coil up.

In a further development of the invention, the illumination device further includes a control unit, which control unit is connected to the light sources, wherein any illumination structures and/or illumination spectres and/or illumination intensities may be adjusted by individual light sources and/or of groups of a plurality of light sources using the control unit. In this way, using the control unit, different illumination states may be achieved on the measuring sample, which may be used for the advantageous illumination of the measuring sample in regard to blooming or areas that are not illuminated sufficiently.

In order to having to provide as few as possible signal lines between control unit and illumination unit for controlling the individual light sources and/or light source groups, at least one part of the control electronics is advantageously integrated directly into the illumination device. If required, for example further parts or units of the control electronics may be arranged in the 3D surface measuring apparatus or in the microscope. This control electronics is communicating with a main control device, for example, merely via a few signal lines or via one signal line in the case of a serial transmission of the control commands. The main control device then sends to the control electronics on the illumination device only coded commands, which light elements are to be switched on or off. The control electronics on the illumination unit then converts these commands into real voltage or current signals to the individual light elements. Similarly, it is possible within the frame of the invention that the entire control electronics of the control unit is, for example, integrated into the illumination device.

In summary, all these previously mentioned advantages provide a significantly more efficient and in regard to the homogeneity of the illumination improved illumination device. A more efficient illumination means that less electric power has to be used in order to achieve a certain illumination intensity, thus also less heat will be introduced into the system of the microscope or the specimen to be examined. This is especially important with high-precision measuring systems, as heat always represents expansion and, hence, inaccuracy. A more homogenous illumination means that also more complex samples or specimens having very shining surfaces may be measured, as there will be essentially less disturbing highlights on the use of the illumination device according to the invention.

BRIEF DESCRIPTION OF THE DRAWINGS

Further details, features and advantages of the invention will become obvious from the following explanation of the embodiment examples schematically illustrated in the drawings. In the drawings.

DETAILED DESCRIPTION

Figure 1:
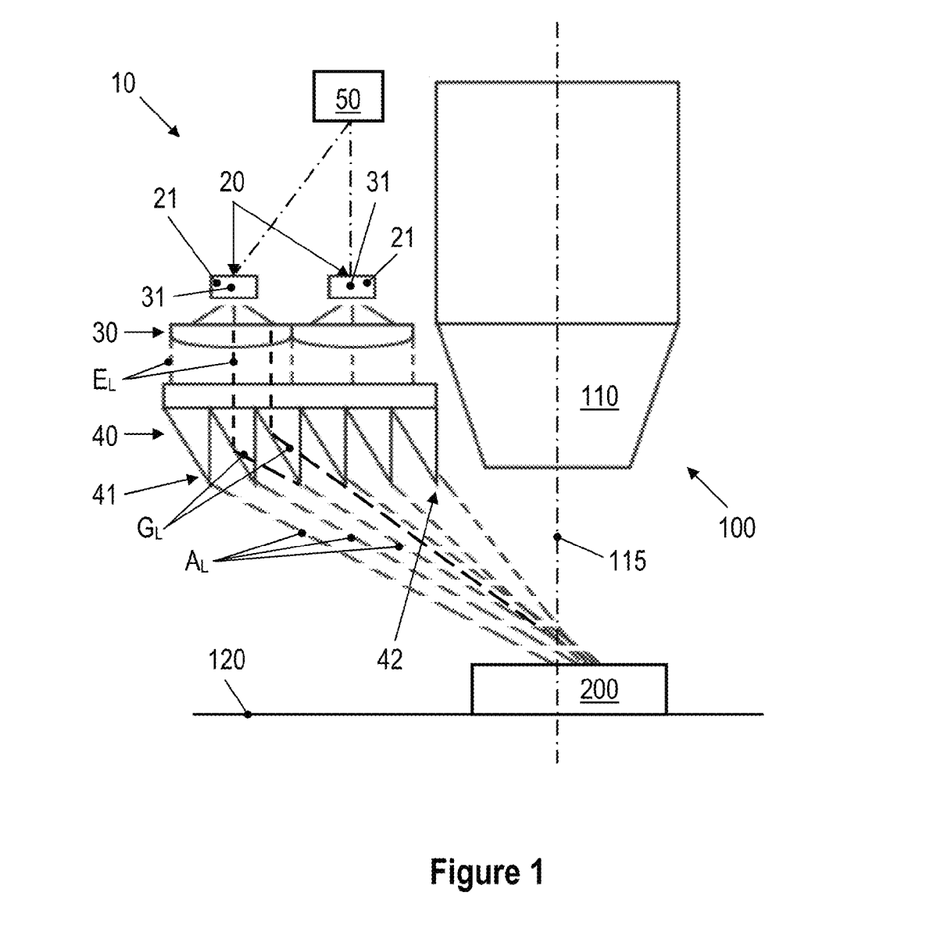
FIG. 1 shows in a sectional side view a detail of an illumination device according to the invention, which is arranged in an annular fashion around an objective of a 3D surface measuring apparatus or a microscope.

FIG. 1 shows in a sectional side view a detail of an illumination device 10 according to the invention, which is arranged at a 3D surface measuring apparatus 100 or a microscope. For this reason, the essentially annular illumination device 10 is attached to an objective 110 of the 3D surface measuring apparatus 100. For reason of clarity, there is illustrated in FIG. 1 only a left half of the annular illumination device 10. The illumination device 10 comprises light sources 20 arranged in a planar fashion for generating an illumination spectrum as well as an illumination optical unit 30, 40 for imaging the illumination spectrum onto an object 200 to be examined, which is disposed on an object slide 120 of the 3D surface measuring apparatus 100. An objective axis 115 of the objective 110 is essentially vertical to a plane of the object slide 120, forming further a symmetry axis 115 for the illumination device 10 attached to the objective 110. In the embodiment of the illumination device 10 illustrated in FIG. 1, the light sources 20 are surface-mounted SMD light-emitting diodes 21.

The illumination optical unit comprises an arrangement of a plurality of converging lenses 30 as well as one Fresnel lens 40, wherein the light beams emitted by the SMD light-emitting diodes 21, which are depicted in dashed lines, firstly impinge on the converging lenses 30 and then impinge further on the Fresnel lens 40 as essentially parallel-directed entry light beams $E_L$. The Fresnel lens 40 is arranged in a reflective arrangement according to the invention, wherein a prism structure 41 having lens vertices 42 is arranged at a light exit side 44 of the Fresnel lens, facing away from the converging lenses 30. The SMD light-emitting diodes 21 are arranged such that these will be disposed within the focal points 31 of the converging lenses 30.

The Fresnel lens 40 has a planar first surface $F_I$ at a light entry side 43, wherein incident entry light beams $E_L$ impinge in an essentially perpendicular manner on the first surface $F_I$ and wherein second surfaces $F_{II}$ as well as third surfaces $F_{III}$ are arranged at the light exit side 44 of the Fresnel lens 40, wherein the second surfaces $F_{II}$ and the third surfaces $F_{III}$ each form corner angles $\varepsilon_1$, $\varepsilon_2$, $\varepsilon_3$, $\varepsilon_4$ of the prism structure 41. The third surfaces $F_{III}$ of the prism structure 41, for this reason, are arranged essentially vertically to the first surface $F_I$ at the light entry side 43. The light sources 30 are connected to a control unit 50.

Figure 4:
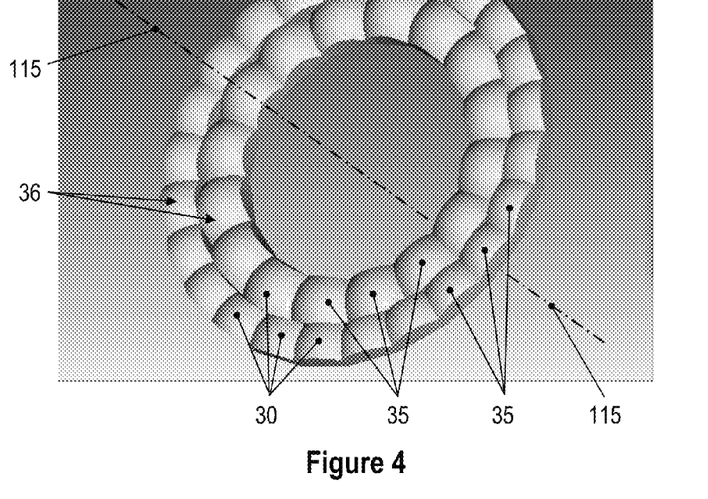
FIG. 4 shows in an isometric view a plurality of converging lenses, which are arranged as annular segments in two concentric rings adjoining one another.
Figure 5:
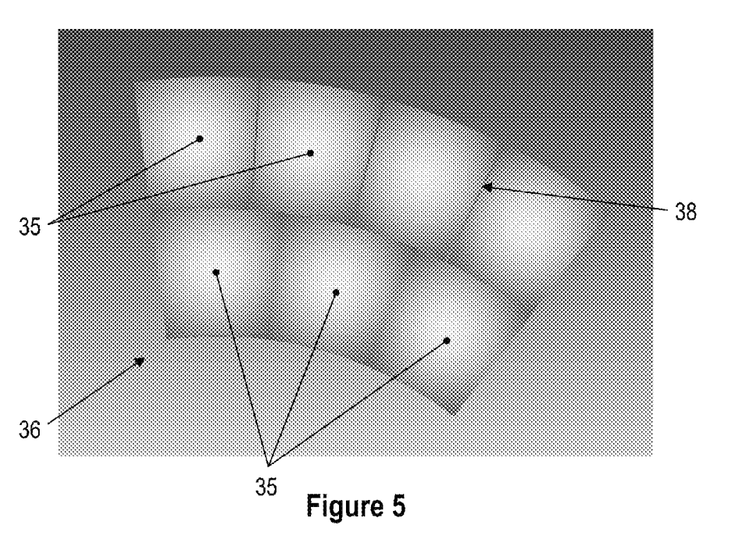
FIG. 5 shows in an isometric view a detail of FIG. 4, wherein a segment of concentrically arranged converging lenses is depicted in annular segment form.

In FIG. 1, the converging lenses 30, as illustrated in detail in the following illustrations FIG. 4 and FIG. 5, are formed by annular segments 35, wherein adjacent annular segments 35 adjoin one another in a planar fashion at least at one segment side surface 38. Adjacent annular segments, hence, are arranged in an annular fashion one towards the other. In order to achieve an as efficient and bright as possible illumination, the annular segments 35 are further arranged in concentric rings 36 adjoining one another. The annular segments 35 arranged in an annular 36 fashion are thus arranged concentrically about the objective axis 115 at an objective 110 of the 3D surface measuring apparatus 100.

Figure 2:
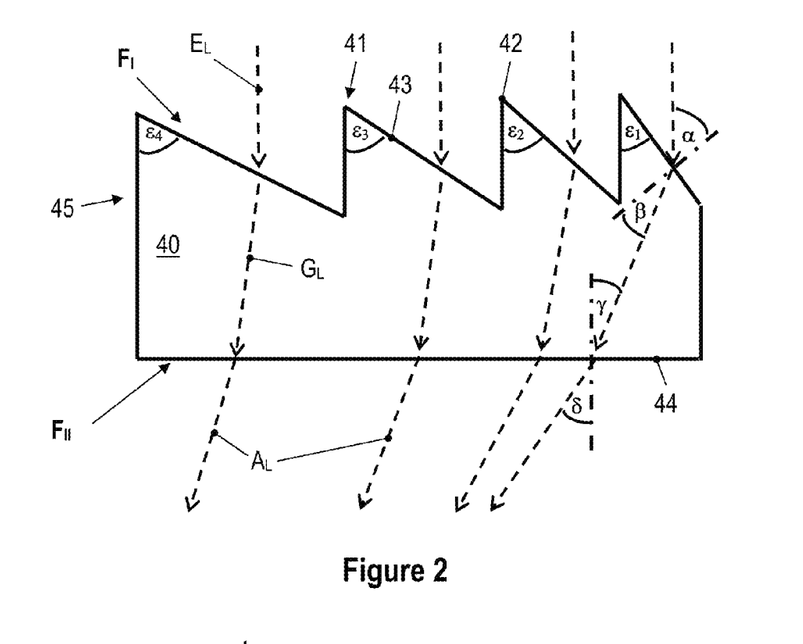
FIG. 2 shows in a schematic side view a light beam passage through a Fresnel lens of an illumination device, wherein the Fresnel lens is penetrated by radiation in a transmitting arrangement known from prior art.

FIG. 2 shows in a schematic side view a light beam passage through a Fresnel lens 40 of an illumination device, wherein the Fresnel lens 40 is penetrated by radiation from a transmitting arrangement 45 known from prior art. Entry light beams $E_L$ having an essentially parallel beam course thereby impinge on the prism structure 41 of this transmittingly 45 arranged Fresnel lens 40 at an incident angle $\alpha$, and are thereby refracted at the first surfaces $F_I$, each obliquely inclined at individual corner angles $\varepsilon_1$, $\varepsilon_2$, $\varepsilon_3$, $\varepsilon_4$, which form lens vertices 42 with the edge surfaces of the prism structure 41 oriented in the direction of the entry light beams $E_L$, respectively at an entry refraction angle $\beta$ from the optically thinner medium—herein, ambient air—to the optically denser medium—herein a Fresnel lens 40, e.g. made from PMMA plastics.

The first surfaces $F_I$ form a light entry side 43 of the Fresnel lens. The incident angle $\alpha$ as well as the entry refraction angle $\beta$ are each indicated in relation to the vertical onto the obliquely inclined first surfaces $F_I$ of the prism structure 41. The refracted light beams $G_L$ move within the Fresnel lens 40 further onto the second surfaces $F_{II}$, which form a light exit side 44 of the Fresnel lens 40. Upon impinging on the second surfaces $F_{II}$, the refracted light beams $G_L$ are diffracted at an exit refraction angle $\gamma$, which is determined in relation to a vertical onto the second surfaces $F_{II}$, from an optically denser medium to an optically thinner medium—the ambient air—, and exit the Fresnel lens 40 as exit light beams $A_L$ at an exit angle $\delta$, which is determined in relation to a vertical onto the second surfaces $F_{II}$, at the light exit side 44.

Figure 3:
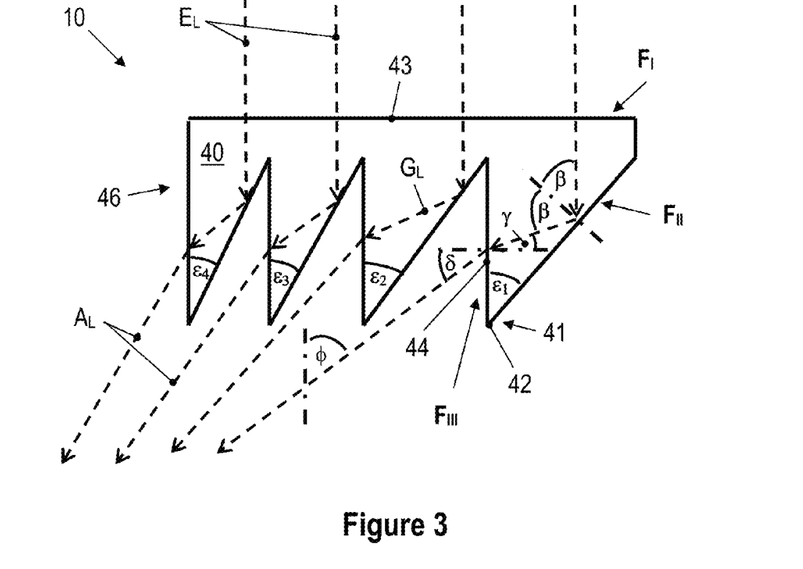
FIG. 3 shows in a schematic side view a light beam passage through a Fresnel lens of an illumination device according to the invention, wherein the Fresnel lens is penetrated by radiation in a reflective arrangement.

FIG. 3 shows in a schematic side view a light beam passage through a Fresnel lens 40 of an illumination device 10 according to the invention, wherein the Fresnel lens 40 is penetrated by radiation in a reflective arrangement 46. Entry light beams $E_L$ that are essentially in parallel to each other thereby impinge on the first surface $F_I$ of the Fresnel lens 40, which forms a planar light entry side 43, which is oriented perpendicularly to the direction of the entry light beams $E_L$ that are in parallel to each other. The planar light entry side 43 is herein arranged in the light passage direction towards the light sources 20 that are not depicted in FIG. 3 or towards the converging lenses 20 also not depicted, respectively. The entry light beams $E_L$ that are in parallel to each other, hence, reach the Fresnel lens 40 without refraction angle. Inside the Fresnel lens 40, the entry light beams $E_L$ that are in parallel to each other impinge at an entry refraction angle $\beta$ on the obliquely inclined second surfaces $F_{II}$, passing through a total reflexion, wherein the entry refraction angle $\beta$ is determined in relation to a vertical onto the second surfaces $F_{II}$. Upon impinging on the second surfaces $F_{II}$, the reflected and refracted light beams $G_L$ are directed at an exit refraction angle $\gamma$, which exit refraction angle $\gamma$ is determined in relation to a vertical onto the third surfaces $F_{III}$, towards the third surfaces $F_{III}$, wherein the exit light beams $A_L$ exit the Fresnel lens 40 at an exit angle $\delta$, which is determined in relation to a vertical onto the third surfaces $F_{III}$, at the third surfaces $F_{III}$ of the prism structure 41.

The second surfaces $F_{II}$ as well as the third surfaces $F_{III}$ herein form the light exit side 44 of the Fresnel lens 40. The corner angles $\varepsilon_1$, $\varepsilon_2$, $\varepsilon_3$, $\varepsilon_4$ between the second surfaces $F_{II}$ and the third surfaces $F_{III}$ of the prism structure 41 of the Fresnel lens 40 herein are, for example, from 30° to 40°. In the reflective arrangement 46 of the Fresnel lens 40 according to the invention, shown in FIG. 3, the exit angle $\delta$, which is determined in relation to a vertical onto the third surfaces $F_{III}$, is then converted into an exit angle $\phi$, which is determined vertically to the third surfaces $F_{III}$ and, hence, in relation to the direction of the entry beams $E_L$, in accordance with the relation $\delta=90°-\phi$. In this way, it is possible to directly compare the exit angles $\delta$ according to the transmissive arrangement 45 of the Fresnel lens 40—as shown in FIG. 2—with the exit angles $\phi$ according to the reflective arrangement 46 of the Fresnel lens 40 in FIG. 3.

From the following calculations, which are summarized in the following table, there is clearly obvious that using the reflective arrangement of the Fresnel lens for a typical angular range of the exit angles $\delta$ or $\phi$ of a ring illumination, for example from $\phi=45°$ to $\phi=70°$, it is possible to achieve a significantly higher illumination efficiency, an improved homogeneity of the light losses in the angular range indicated, as well as lens structures of the Fresnel lenses that are easier to be produced in terms of manufacture.

In the case of an reflective arrangement 46 according to the invention of the Fresnel lens 40, which is illustrated in FIG. 3, the following is true: If there is to be realized an angular range of the exit angle $\phi$ from $\phi=45°$ to $\phi=70°$, then the corner angles $\varepsilon$ of the prism structure 41 are merely in the range of $\varepsilon=30.8°$ to $\varepsilon=38.4°$.

The angle at total reflexion, for example in a plastic lens made of the lens material polymethyl acrylate (PMMA), having a refraction index n=1.49 according to the formular: arcsin(1/1.49) is about 42°. As the refraction index of optical plastic material lies within the range of n=1.45 to n=1.6, the angle of total reflextion will thus vary between 43.5° and 46°. Using a different plastic material, the structure will change slightly, of course.

TABLE

Comparative values between a transmissive (or transmitting) arrangement 45 (according to FIG. 2) and a reflective (or reflecting) arrangement 46 (according to FIG. 3) of a Fresnel lens 40

|  | Transmissive arrangement of the Fresnel lens (Pos. 45, FIG. 2) | | Reflective arrangement of the Fresnel lens (Pos. 46, FIG. 3) | |
| --- | --- | --- | --- | --- |
| Angle range (exit angle) | $\delta = 45°$ | $\delta = 70°$ | $\phi = 45°$ | $\phi = 70°$ |
| Corner angle ($\varepsilon$) | 23.8° | 9.5° | 30.8° | 38.4° |
| Transmission | 81% | 50% | 91% | 92% |
| Homogeneity | ~60% | | ~99% | |

Calculation of the Transmitting Arrangement of the Fresnel Lens (According to FIG. 2):

In the case of a transmitting arrangement 45 of the Fresnel lens 40, shown in FIG. 2, on light beam passage there is realized, at both lens surfaces, a refraction or beam refraction, respectively. With an illumination having a high numerical aperture—i.e. having large angles—the prism structure 41 of the Fresnel lens 40 will thus become very steep. Thus, efficiency will become relatively low and the structure 41 is difficult to be produced.

Typical angular ranges of the required exit angle $\delta$ in objectives having a small operational distance—i.e. having high magnification—in turn are $\delta=45°$ to $\delta=70°$.

If there is to be realized an exit angle having $\delta=70°$ aperture using this structure or a transmitting arrangement 45 of the Fresnel lens 40 (according to FIG. 2), respectively, the following is true:

$\gamma=\arcsin(\sin(\delta)/1.49)=39.1°$ $\alpha=\arctan(1.49*\sin(\gamma)/(1.49*\cos(\gamma)-1))\sim 80.5°$ $\beta=\alpha-\gamma=40.6°$ $\varepsilon=90-\alpha=9.5°$ The losses of the Fresnel lens on the surfaces, in the case of using a transmitting Fresnel lens 45 (according to FIG. 2), which is known from prior, are thus approximately (at a refraction index n=1.49):

40% loss with refraction at the first surface $F_I$ and

17% loss with refraction at the second surface $F_{II}$.

Hence, in this case, in total about 50% of the light will be lost on passage through the Fresnel lens 40 arranged transmittingly 45. Furthermore, the prism structures 41 of the Fresnel lens 40 having as small corner angles $\varepsilon$ as about 10° are difficult to produce, and the lens vertices 42, hence, are very prone to damage.

If there is to be achieved an exit angle having an aperture of $\delta=45°$ using the structure illustrated in FIG. 2, the following is true:

$\gamma=\arcsin(\sin(\delta)/1.49)=28.3°$ $\alpha=\arctan(1.49*\sin(\gamma)/(1.49*\cos(\gamma)-1))\sim 66.2°$ $\beta=\alpha-\gamma=37.9°$ $\varepsilon=90-\alpha=23.8°$ The losses at the surfaces in this care are (again calculated assuming a refraction index of n=1.49):

14% loss with refraction at the first surface $F_I$ and

5% loss with refraction at the second surface $F_{II}$.

In this case, in total about 19% of the light will be lost upon passage through the transmittingly 45 arranged Fresnel lens 40.

As calculated, the light loss across an angular range of $\delta=45°$ to $\delta=70°$ is rather different with the transmission structure; i.e. the homogeneity of the illumination across the angular range examined is unsatisfyingly lower with the transmitting arrangement 45 according to FIG. 3, amounting to only about 60%.

Calculation of the Reflective Arrangement of the Fresnel Lens (According to FIG. 3):

In this arrangement 46, reflexion and refraction of the light beams is realized within the Fresnel lens 40. As already mentioned, the angle of total reflexion in a plastic lens made from the lens material polymethyl methacrylate (PMMA) is about 42°.

For example, if there is to be achieved an exit angle aperture $\phi=70°$ using this structure or in a reflective arrangement 46 according to FIG. 3, respectively, the following is true:

$\delta=90°-\phi=90°-70°=20°$ $\gamma=\arcsin(\sin(\delta)/1.49)=\arcsin(\sin(20°)/1.49)=13.3°$ assuming $n=1.49$ as a refraction index of PMMA, there is concluded:

$\beta=(90+\gamma)/2=51.65°$ $\varepsilon=(180-2*\beta)/2=38.35°$

As a consequence, in contrast to a transmitting 45 Fresnel lens, herein the lens vertices 42 of the prism structure 41 are less steep and have a larger corner angle $\varepsilon$ in an advantageous reflective arrangement 46 of the Fresnel lens 40 according to FIG. 3. Due to the less steep prism structure 41, the production of this Fresnel lens 40 is essentially easier, and the Fresnel lens according to FIG. 3, hence, is also less prone to damage. The loss in case of refraction at the third surface $F_{III}$ is relatively low in the advantageous reflective arrangement 46, amounting to about 4% stray loss. At the second surface $F_{II}$ of the Fresnel lens 40 there is realized total reflexion. The refraction index at the first surface $F_I$ is similarly about 4% stray loss. In this case, on light passage through a reflectively arranged 46 Fresnel lens 40 (according to FIG. 3) at an exit angle $\phi=70°$, in total only about 8% of the light will be lost.

In this case of a reflectively arranged 46 Fresnel lens 40, the prism structure 41 will become steeper, if there are to be realized small exit angles $\phi$ of, for instance, $\phi=45°$:

$\delta=90°-\phi=90°-45°=45°$ $\gamma=\arcsin(\sin(\delta)/1.49)=\arcsin(\sin(45°)/1.49)=28.3°$ assuming $n=1.49$ as a refraction index of PMMA, there is concluded:

$\beta=(90+\gamma)/2=59.2°$ $\varepsilon=(180-2*\beta)/2=30.8°$

In this case, upon light passage through a reflective 46 Fresnel lens 40 (according to FIG. 3) having an exit angle $\phi=45°$, the prism structure 41 is advantageously still inclined lower and thus easier to be produced than the comparable case known from prior art.

The loss in the case of refraction at the third surface Fiji is relatively low, still amounting to about 4% stray loss. At the second surface $F_{II}$ total reflection is realized. The refraction loss at the first surface $F_I$ herein is about 5% stray loss. In this case, on light passage through a reflectively arranged 46 Fresnel lens 40 (according to FIG. 3) having an exit angle $\phi=45°$, in total only about 9% of the light will be lost.

In the case of the reflective arrangement 46 of the Fresnel lens 40, the light loss across the angular range is very similar, whereby an essentially more homogenous distribution of the light across the angular range will be achieved.

Both structures shown in FIG. 2 and FIG. 3 have further losses due to shading; these, however, lie in a very similar range, which is why in the previous calculation these losses have not been taken into account.

Figure 6:
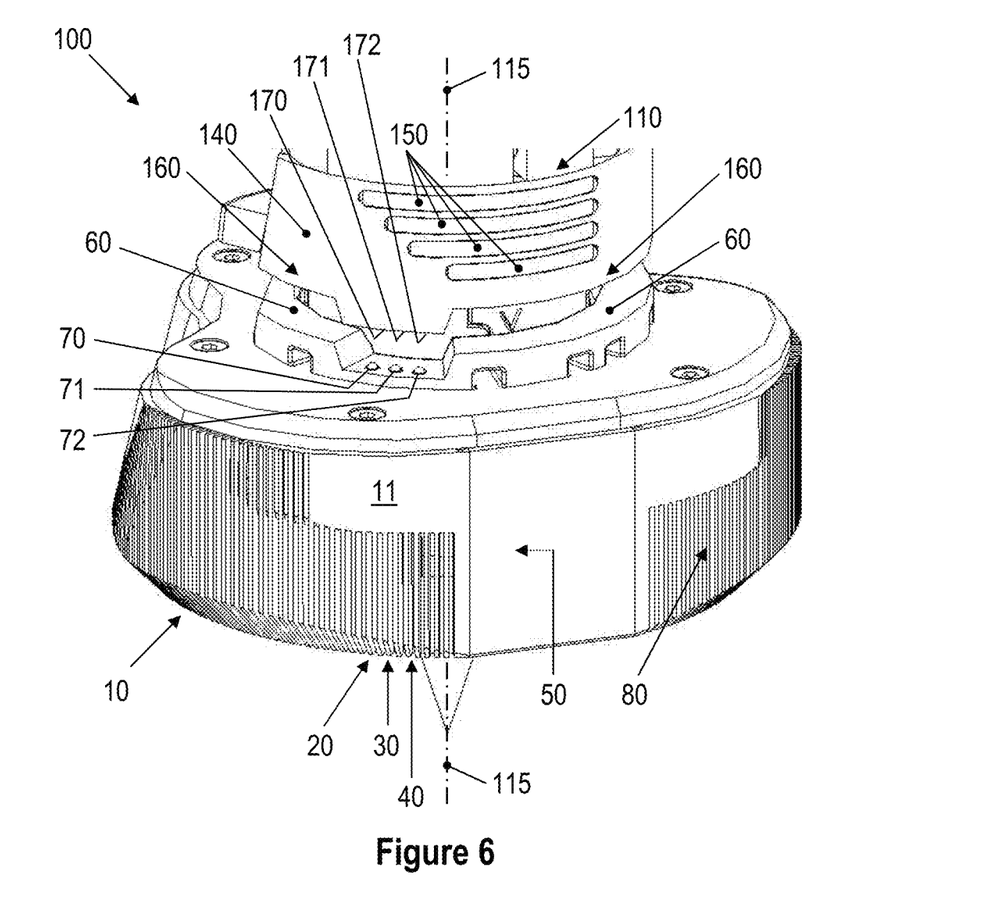
FIG. 6 shows in an isometric front view an embodiment according to the invention of an illumination device in a position attached to the objective of a 3D surface measuring apparatus.

FIG. 6 shows in an isometric front view an embodiment according to the invention of an illumination device 10 in a position attached to an objective 110 of a 3D surface measuring apparatus 100. Within a removable, essentially annular housing 11 of the illumination device 10, there are located the light sources 20, the converging lenses 30 as well as the Fresnel lens 40, which is replaceably attached within the housing 11 in the embodiment shown herein. In this way, if required, in the case of different operational distances between objective 110 and specimen 200, there may be used different Fresnel lenses 40 having different focal lengths for the illumination. Within the housing 11, there are further located at least a part of the control unit 50 or the control electronics, respectively, as well as several attachment magnets 60 distributed along the circumferential direction. The attachment magnets 60 are inserted or moulded into the housing 11, which is made from, for example, plastic material.

For the provision of power supply and/or for signal transmission, between the control unit 50 and the 3D surface measuring apparatus, there are used several contact connectors, which are also arranged at the housing 11 of the illumination device 10. Herein, there are depicted a contact connector 70 for mass, a contact connector 71 for the power supply as well as another contact connector 72 for a signal control. Furthermore, the illumination device 10 according to the invention is provided with several cooling bodies 80 for temperature control or for cooling, respectively, of the optical components 30, 40 as well as for the heat dissipation of the light sources 20.

The 3D surface measuring apparatus 100, for example, has several interchangeable objectives 110 each having objective axes 115, which are attached at a rotatable objective revolver. At each interchangeable objective 110, there is attached to the external side of the objective 110 a contact ring 140 having a plurality of sliding contacts 150. There are further integrated holding magnets 160 in the contact ring 140, which holding magnets 160 are each magnetically engaged by the plurality of attachment magnets 60, which are arranged distributively on the circumference of the housing 11 of the illumination device 10, upon connection of the illumination device 10. Also the contact connectors complementary to the contact connector 70 for mass, the contact connector 71 for the power supply as well as the contact connector 72 for a signal control, this is a mating contact 170 for mass, a mating contact 171 for the power supply as well as a further mating contact 172 for the signal control, are located at the bottom side of the contact ring 140, each entering a conductive connection in the connected state of the illumination device 10 with the corresponding contacts 70, 71 or 72, respectively.

In this way, there is realized a snap fit, which is especially conveniently to be operated and acting as a magnet, between the attachment magnets 60 of the illumination device 10 and the holding magnets 160 attached at the respective objective 110. The illumination device 10 is, for this purpose, mounted onto that objective 110, which is currently in an operational position, being attached thereto in a magnetic manner. In the case of an objective replacement, the illumination device 10 is simply removed and mounted onto an appropriate next objective 110, which is also provided with a contact ring 140. The sliding contacts 150 are in the operational position of the objective 110 each in a conductive connection with the appropriate corresponding mating contacts, which are located at a part of the 3D surface measuring apparatus 100 not depicted herein. The sliding contacts 150 each serve for the supply of power and/or as contacts for signal transmission.

Figure 7:
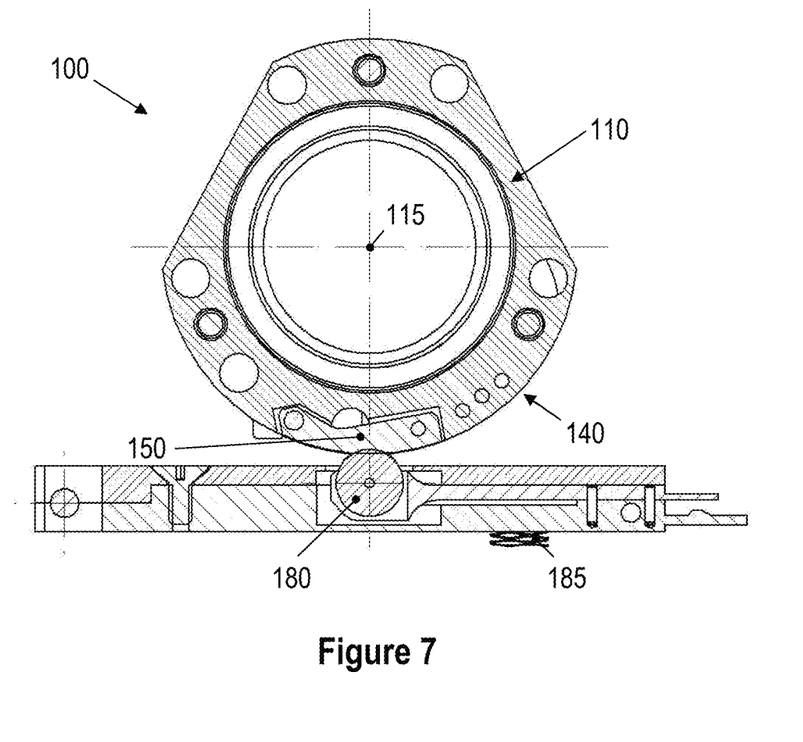
FIG. 7 shows in a bottom view an objective of a 3D surface measuring apparatus having an electric sliding contact with the power supply of an illumination device not depicted herein.

FIG. 7 shows in a bottom view an objective 110 of a 3D surface measuring apparatus 100 having an electric sliding contact 150 for the power supply of an illumination device not depicted herein. The sliding contact 150 is thereby located at a circumferential section of the objective 110 or at the contact ring 140 attached to the objective 110. The objective 110 is currently in an operational position, which is why the contact ring 140 is connected with the the sliding contacts 150 with corresponding contact discs 180, which are attached at the measuring device by means of a spring 185. The contact discs 180 are pressed onto the sliding contacts 150 by means of the spring 185, thus ensuring a continuous power and signal transmission between measuring device 100 and objective 110. This power and signal transmission is advantageously realized without cables, which is why in the case of pivoting the interchangeable objectives 110 there has not be taken into consideration power and/or signal cables that are coiling up.

LIST OF REFERENCE NUMERALS 10 illumination device
11 housing of the illumination device
20 light source
21 SMD light-emitting diode
30 converging lens
31 focal point of the converging lens
35 annular segment
36 concentric ring
38 segment side surface
40 Fresnel lens
41 prism structure
42 lens vertices
43 light entry side of the Fresnel lens
44 light exit side of the Fresnel lens
45 transmitting Fresnel lens
46 reflective Fresnel lens
50 control unit
60 attachment magnet
70 contact connector for mass
71 contact connector for power supply
72 contact connector for signal control
80 cooling body
100 3D surface measuring apparatus or microscope
110 objective of the 3D surface measuring apparatus or microscope
115 objective axis
120 object slide
140 contact ring
150 sliding contact
160 holding magnet
170 mating contact connector for mass
171 mating contact connector for power supply
172 mating contact connector for signal control 180 contact disc
185 spring
200 specimen or object to be examined
$A_L$ exit light beam from the Fresnel lens
$E_L$ entry light beam into the Fresnel lens
$F_I$ first surface of the Fresnel lens
$F_{II}$ second surface of the Fresnel lens
$F_{III}$ third surface of the Fresnel lens
$G_L$ refracted light beam in the Fresnel lens
α incident angle
β entry refraction angle from the optically thinner to the optically denser medium
γ exit refraction angle from the optically denser to the optically thinner medium
δ exit angle vertical to the exit surface of the Fresnel lens
ε corner angle of the prism structure (or $\varepsilon_1$, $\varepsilon_2$, $\varepsilon_3$, $\varepsilon_4$, resp.)
φ exit angle in parallel to the exit surface of the Fresnel lens

The invention claimed is:

1. An illumination device, comprising:
light-emitting diode light sources arranged in a planar fashion and operable to generate an illumination spectrum; and
an illumination optical unit for imaging the illumination spectrum onto an object to be examined, wherein the illumination optical unit comprises:
a plurality of converging lenses formed by annular segments wherein adjacent annular segments adjoin one another in a planar fashion at a segment side surface, and
a Fresnel lens having a prism structure and formed in a reflective arrangement such that the lens vertices of the Fresnel lens are oriented at a light exit side of the Fresnel lens, facing away from the converging lenses, and
wherein light beams emitted by the light sources first impinge on the converging lenses and then impinge further on the Fresnel lens as parallel-directed entry light beams ($E_L$).

2. An illumination device according to claim 1, wherein adjacent annular segments are arranged in an annular fashion one towards the other.

3. An illumination device according to claim 1, wherein the annular segments are arranged in concentric rings adjoining one another.

4. An illumination device according to claim 3, wherein the annular segments that are arranged in an annular fashion are arranged concentrically with respect to an objective axis of an objective.

5. An illumination device according to claim 1, wherein the Fresnel lens has a planar first surface ($F_I$) at a light entry side, wherein incident entry light beams ($E_L$) impinge in a perpendicular manner on the first surface ($F_I$), and wherein second surfaces ($F_{II}$) as well as third surfaces ($F_{III}$) are arranged at the light exit side of the Fresnel lens, wherein the second surfaces ($F_{II}$) and the third surfaces ($F_{III}$) each form corner angles $\varepsilon_1$, $\varepsilon_2$, $\varepsilon_3$, $\varepsilon_4$) of the prism structure.

6. An illumination device according to claim 5, wherein the third surfaces ($F_{III}$) of the prism structure are arranged vertically to the first surface ($F_I$) at the light entry side.

7. An illumination device according to claim 5, wherein entry light beams ($E_L$) within the Fresnel lens impinge at an entry refraction angle (β) on the second surfaces ($F_{II}$) and thereby pass through a total reflexion, wherein the entry refraction angle (β) is determined in relation to a vertical onto the second surfaces ($F_{II}$), wherein the refracted light beams ($G_L$) that are reflected upon impinging on the second surfaces ($F_{II}$) impinge at an exit refraction angle (γ), which exit refraction angle (γ) is determined in relation to a vertical onto the third surfaces ($F_{III}$), on the third surfaces ($F_{III}$), and wherein the exit light beams ($A_L$) exit the Fresnel lens at an exit angle (δ), which is determined in relation to a vertical onto the third surfaces ($F_{III}$), at the third surfaces ($F_{III}$) of the prism structure.

8. An illumination device according to claim 5, wherein the corner angles ($\varepsilon_1$, $\varepsilon_2$, $\varepsilon_3$, $\varepsilon_4$) between the second surfaces ($F_{II}$) and the third surfaces ($F_{III}$) of the prism structure of the Fresnel lens are in a range of 20° to 50°.

9. An illumination device according to claim 1, wherein the light-emitting diodes are arranged in the focal points of the converging lenses.

10. An illumination device according to claim 1, wherein the light sources are surface-mounted SMD light-emitting diodes.

11. An illumination device according to claim 1, wherein the illumination device is mountable onto an objective of a 3D surface measuring apparatus or a microscope or removed therefrom, respectively.

12. An illumination according to claim 11, wherein the illumination device is attachable to an objective of a 3D surface measuring apparatus or a microscope in a removable manner.

13. An illumination device according to claim 11 wherein the illumination device, in a position mounted onto an objective, is conductively connectible to complementary power supply connectors disposed on the objective and/or on the 3D surface measuring apparatus or the microscope by way of power supply contacts.

14. An illumination device according to claim 1, further comprising a control unit, which is connected to the light sources, wherein illumination structures and/or illumination spectres and/or illumination intensities are adjustable by individual light sources and/or by groups of a plurality of light sources using the control unit.

* * * * *